United States Patent
Block et al.

(10) Patent No.: US 6,299,913 B1
(45) Date of Patent: Oct. 9, 2001

(54) MACROMINERAL DIETARY FACTORS IN RUMINANT NUTRITION

(75) Inventors: Elliot Block, Yardley, PA (US); William K. Sanchez, Tigard, OR (US); William Zuccarella, Cream Ridge; Kenneth R. Cummings, Skillman, both of NJ (US)

(73) Assignee: Church & Dwight Co., Inc., Princeton, NJ (US)

( * ) Notice: Subject to any disclaimer, the term of this patent is extended or adjusted under 35 U.S.C. 154(b) by 0 days.

(21) Appl. No.: 09/625,286

(22) Filed: Jul. 25, 2000

(51) Int. Cl.⁷ .................................................. A23K 1/175
(52) U.S. Cl. ................... 426/2; 426/74; 426/807
(58) Field of Search .................... 426/2, 74, 807

(56) References Cited

U.S. PATENT DOCUMENTS

| | | | |
|---|---|---|---|
| 4,857,332 | * 8/1989 | Schricker | 424/442 |
| 4,976,963 | * 12/1990 | Schricker et al. | 424/438 |
| 5,219,596 | * 6/1993 | Smith et al. | 426/2 |
| 5,264,227 | * 11/1993 | Laroche et al. | 426/72 |
| 5,360,823 | * 11/1994 | Griffel, Jr. et al. | 514/706 |
| 5,686,125 | * 11/1997 | Mueller | 426/74 |

OTHER PUBLICATIONS

Sanchez et al., J. Dairy Sci., vol. 80, pp. 1207–1216, 1997.*
Delaquis et al., J. Dairy Sci., vol. 78, pp. 2024–2039, 1995.*

* cited by examiner

*Primary Examiner*—Chhaya D. Sayala
(74) *Attorney, Agent, or Firm*—Watov & Kipnes, P.C.

(57) ABSTRACT

This invention provides a feedstock for improving the lactational performance of dairy cows. An essential feature of an invention feedstock is a dietary cation-anion difference (DCAD) with a value between about 25–60 meq/100 g dietary DM. Other essential features of a preferred feedstock are an atomic ratio of potassium:sodium between about 1–5:1, a weight ratio of potassium:magnesium between about 3–5:1, and DCAD sodium-containing and potassium-containing macrominerals are selected from bicarbonate, carbonate and sesquicarbonate type compounds.

18 Claims, No Drawings

MACROMINERAL DIETARY FACTORS IN RUMINANT NUTRITION

BACKGROUND OF THE INVENTION

This invention generally relates to macromineral dietary factors with respect to ruminant nutrition. More specifically this invention relates to the effect of dietary cation-anion difference (DCAD) on the health and lactational performance of dairy cows.

Dietary macromineral elements are necessary for proper health and productive performance of lactating dairy cows. As a class of nutrients, these elements have been the subject of extensive research, and considerable information exists about individual effects of each micromineral element. Information on interrelationships of macromineral elements in diets for lactating dairy cows is relatively limited.

An early publication was the first to propose that mineral interrelations were related to acid-base status [J. Biol. Chem., 58, 235 (1922)]. It was proposed further that maintenance of normal acid-base equilibrium required excretion of excess dietary cations and anions. It was hypothesized that consumption of either excess mineral cations relative to anions or excess anions relative to cations resulted in acid-base disturbances in animals (A. T. Shohl. Mineral Metabolism. Reinhold Publishing Corp., New York. 1939).

Once animal nutritionists began to test this hypothesis, mineral interrelationships were found to affect numerous metabolic processes, and there was evidence that mineral interrelationships had profound influences. It was theorized that for an animal to maintain its acid-base homeostasis, input and output of acidity had to be maintained. It was shown that net acid intake was related to the difference between dietary cations and anions. The monovalent macromineral ions Na, K and Cl were found to be the most influential elements in the interrelationship (P. Mongin. Page 1, Third Ann. Int. Mineral Conf. Orlando, Fla. 1980).

Nutrient metabolism in animals results in the degradation of nutrient precursors into strong acids and bases. In typical rations fed to dairy cattle, inorganic cations exceed dietary inorganic anions by several milliequivalents (meq) per day. Carried with excess dietary inorganic cations are organic anions which can be combusted to $HCO_3^-$. Consequently, a diet with excess inorganic cations relative to inorganic anions is alkalogenic, and a diet with excess inorganic anions relative to cations is acidogenic.

Chloride is the most acidogenic element to be considered. An excess of dietary chloride can lead to a respiratory and/or metabolic acidosis. The acidogenic influence of chloride can be negated by sodium and potassium which are alkalogenic elements. Conversely, excess intake of sodium or potassium can induce metabolic alkalosis.

Blood pH ultimately is determined by the number of cation and anion charges absorbed in the blood. If more anions than cations enter the blood from the digestive tract, blood pH will decrease. It was proposed that a three-way interrelationship among dietary Na, K and Cl, i.e., the sum of Na plus K minus Cl [in meq per 100 g diet of dry matter (DM)], could be used to predict net acid intake. The term "dietary cation-anion difference (DCAD)" was coined to represent the mathematical calculation (W. K. Sanchez and D. K. Beede. Page 31, Proc. Florida Rum. Nutr. Conf. Univ. of Florida. 1991). Expressed in its fullest form, DCAD is written as follows:

meq $[(Na^+ + K^+ + Ca^{+2} + Mg^{+2}) - (Cl^- + SO_4^{-2} + PO_4^{-3})]/100$ g of dietary dry matter (DM).

A problem with including the multivalent macrominerals (Ca, Mg, P and S) in the DOAD expression for ruminants relates to the variable and incomplete bioavailability of these ions compared to Na, K and Cl. The expression employed most often in non-ruminant nutrition is the monovalent cation-anion difference:

meq $(Na^+ + K^+ - Cl^-)/100$ g dietary DM

Because of the additional use of sulfate salts in prepartum rations, the expression that has gained most acceptance in ruminant nutrition is as follows:

meq $(Na^+ + K^+) - (Cl^- + SO_4^{-2})/100$ g dietary DM

For a calculation, mineral concentration are first converted to milliequivalents:

$$\text{meq}/100\,g = \frac{\text{(milligrams)(valence)}}{\text{(g atomic weight)}}$$

The following illustrates a calculation of the meq Na+K−Cl−S value of a diet with 0.18% Na, 1.0% K, 0.25% Cl and 0.2% S. There are 180 mg Na (0.18%=0.18 g/100 g or 180 mg/100 g), 1000 mg K (1.0% K), 250 mg Cl (0.25% Cl) and 200 mg S (0.2% S) per 100 g dietary DM. The $SO_4^-$ entity is calculated as atomic sulfur.

$$\text{meq Na} = \frac{(180\text{ mg})(1\text{ valence})}{(23\text{ g atomic weight})} = 7.8\text{ meq Na}$$

$$\text{meq K} = \frac{(1000\text{ mg})(1\text{ valence})}{(39\text{ g atomic weight})} = 25.6\text{ meq K}$$

$$\text{meq Cl} = \frac{(250\text{ mg})(1\text{ valence})}{(35.5\text{ g atomic weight})} = 7.0\text{ meq Cl}$$

$$\text{meq S} = \frac{(200\text{ mg})(2\text{ valence})}{(32\text{ g atomic weight})} = 12.5\text{ meq S}$$

The calculated DCAD value is as follows:

meq (Na+K−Cl−S)=7.8+25.6−7.0−12.5=13.9 meq/100 g dietary DM

A simpler expression is as follows:

$$DCAD = (0.18\% \, Na/0.023) + (1.0\% \, K/0.039) -$$
$$(0.25\% \, Cl/0.355) - (0.2\%/0.016)$$
$$= +13.9 \text{ meq}/100\text{ g dietary DM}$$

A study was conducted which was designed specifically to evaluate the effect of DCAD on acid-base status and lactational performance of dairy cattle. Diets formulated with −10, 0, +10 or +20 DCAD were compared. A diet with +20 improved dry matter intake (DMI) 11% and milk yield (MY) 9% compared with a −10 DCAD diet. Blood bicarbonate ($HCO_3^-$) increased linearly with increasing DCAD, which indicated an improvement in acid-base status with high DCAD compared with low DCAD. It was concluded that responses to increasing DCAD were independent of specific Na, K and Cl effects [J. Dairy Sci., 71, 346 (1988)].

Another study evaluated the influence of Na, K and Cl at constant DCAD. Diets were formulated to provide +32 DCAD in (1) a basal diet adequate in dietary Na, K and Cl; (2) a basal diet containing an additional 1.17% NaCl; and (3) a basal diet containing an additional 1.56% KCl. Fifteen midlactation cows were assigned to replicated 3×3 Latin squares. The KCl-fed cows consumed more DM and had a lower milk fat percentage than NaCl-fed cows, but there were no differences in milk yield. It was concluded that dietary DCAD was a more important determinant of dietary impact on systemic acid-base status than actual dietary concentrations of Na, K and Cl [(J. Dairy Sci., 73, 3485 (1990)].

An extensive study was conducted with 48 cows and 15 dietary treatments to investigate lactational and acid-base responses to DCAD as [(Na+K)−(Cl+S)]. DCAD ranged from 0 to +50 [(Na+K)−(Cl+S)]/100 g dietary DM. The basal diet was 54.5% concentrate, 5.5% cottonseed hulls, and 40% corn silage (DM basis). Dry matter intake (DMI) and milk yield (MY) was highest when DCAD was between +17 to +38, and +25 to +40, respectively [J. Dairy Sci., 77, 1661 (1994)].

In another study three switchback experiments were conducted with 12 cows each in early, mid or late lactation. Increasing DCAD from +5.5 to +25.8 in early lactation, and from +14 to +37.3 in midlactation, increased DMI and milk production. These effects were not observed in late lactation when +20 was compared to +37.5 DCAD. The study results supported the concept that response to DCAD is affected by stages of lactation [J. Dairy Sci., 78, 2259 (1995)].

The cumulative DCAD studies indicate that dietary K has a unique role, particularly during heat stress in dairy cows. When potassium carbonate was the source of dietary K, a linear response to dietary K in heat stressed dairy cows was observed. Every 1% increase in K raised fat-corrected milk by 8.9 lbs/day [J. Dairy Sci., 69, 124 (1986); 70, 81 (1987); and 70, 309 (1987)].

The reported studies have established the DCAD concept as an important factor in diet regimen for dairy cows. There are contradictions in the overall DCAD data reported in the literature, so that salient DCAD considerations are incentive for continued investigation.

Accordingly, it is an object of this invention to provide a method for improving the lactational performance of dairy cows.

It is another object of this invention to provide a method for DCAD control to increase the dry matter intake (DMI) of lactating dairy cows.

It is another object of this invention to provide a method for DCAD control to increase the milk yield (MY) of lactating dairy cows.

It is another object of this invention to provide a method for DCAD control to increase the blood bicarbonate ($HCO_3^-$) of lactating dairy cows.

It is a further object of this invention to provide a feedstock for improving the lactational performance of dairy cows, which comprises a supplemented basal ration having a prescribed content of micromineral nutrients, and which is formulated without an incipient chemical heat generation in the basal ration matrix.

Other objects and advantages of the present invention shall become apparent from the accompanying description and example.

DESCRIPTION OF THE INVENTION

One or more objects of the present invention are accomplished by the provision of a method for improving the lactational performance of a dairy cow which comprises feeding a lactating cow with a feedstock having a prescribed content of macromineral nutrients; wherein the relative proportions of macrominerals in the feedstock are defined as a dietary cation-anion difference (DCAD) which corresponds to the equation:

$$DCAD = meq\ (Na^+ + K^+) - (Cl^- + SO_4^{-2})/100\ g\ dietary\ DM$$

where meq is milliequivalents, Na is sodium cations, K is potassium cations, Cl is chloride anions, $SO_4$ is sulfate anions, and DM is dry matter; and wherein DCAD has a value between about 25–60 meq/100 g dietary DM, and the atomic ratio of potassium:sodium in the feedstock is between about 1–5:1; and wherein the DCAD potassium-containing macromineral is selected from the group consisting of potassium bicarbonate, potassium carbonate sesquihydrate, and mixtures thereof.

The term "potassium carbonate sesquihydrate" as employed herein refers to a hydrated inorganic salt having the empirical formula $K_2CO_3 \cdot 1.5\ H_2O$, and any minor content of $2KHCO_3 \cdot K_2CO_3 \cdot 1.5\ H_2O$ species.

The DCAD sodium-containing macromineral preferably is selected from inorganic salts which include sodium bicarbonate, hydrated sodium carbonate, sodium sesquicarbonate, sodium chloride, hydrated sodium sulfate, hydrated sodium phosphate, and mixtures thereof.

In another embodiment this invention provides a method for improving the lactational performance of a dairy cow which comprises feeding a lactating cow with a feedstock having a prescribed content of macromineral nutrients; wherein the relative proportions of macrominerals in the feedstock are defined as a dietary cation-anion difference (DCAD) which corresponds to the equation:

$$DCAD = meq\ (Na^+ + K^+) - (Cl^- + SO_4^{-2})/100\ g\ dietary\ DM$$

where meq is milliequivalents, Na is sodium cations, K is potassium cations, Cl is chloride anions, $SO_4$ is sulfate anions, and DM is dry matter; wherein DCAD has a value between about 25–60 meq/100 g dietary DM, and the atomic ratio of potassium:sodium in the feedstock is between about 1–5:1; and wherein the feedstock has a weight ratio of potassium:magnesium between about 3–5:1; and wherein the DCAD sodium-containing macromineral is selected from the group consisting of sodium bicarbonate, hydrated sodium carbonate, sodium sesquicarbonate, and mixtures thereof, and the DCAD potassium-containing macromineral is selected from the group consisting of potassium bicarbonate, potassium carbonate sesquihydrate, and mixtures thereof.

Magnesium cations can be provided by inorganic compounds which include magnesium oxide, magnesium chloride, magnesium sulfate, and the like.

As demonstrated in the Example, an important aspect of the present invention is a feed regimen for lactating dairy cows which has a prescribed content of macrominerals within a specified DCAD meq range, and which has a specified atomic ratio of potassium and sodium. The presence of both potassium and sodium in a feedstock is an essential feature of the present invention, as demonstrated in the Example.

The beneficial response to the invention feed regimen for lactating dairy cows, with a specified ratio of potassium:sodium, points to the unique role of dietary potassium, particularly during heat stress. Milk requires a high content of potassium, and a heat stressed dairy cow can often be potassium deficient. For optimal lactation performance, an essential weight ratio balance must be maintained between potassium:sodium and potassium:magnesium cations.

In another embodiment this invention provides a feed stock for improving the lactational performance of dairy cows which comprises a supplemented basal ration having a prescribed content of macromineral nutrients; wherein the relative proportions of macrominerals in the feedstock are defined as a dietary cation-anion difference (DCAD) which corresponds to the equation:

$$DCAD = meq\ (Na^+ + K^+) - (Cl^- + SO_4^{-2})/100\ g\ dietary\ DM$$

where meq is milliequivalents, Na is sodium cations, K is potassium cations, Cl is chloride anions, $SO_4$ is sulfate anions, and DM is dry matter; and wherein DCAD has a value between about 25–60 meq/100 g dietary DM, and the atomic ratio of potassium:sodium in the feedstock is between about 1–5:1; wherein the feedstock has a weight ratio of potassium:magnesium between about 3–5:1; wherein the DCAD sodium-containing macromineral is selected from the group consisting of sodium bicarbonate, sodium carbonate, sodium sesquicarbonate, and mixtures thereof, and the DCAD potassium-containing macromineral is selected from the group consisting of potassium bicarbonate, potassium carbonate sesquihydrate, and mixtures thereof; and wherein the microminerals are incorporated in the feedstock without incipient chemical heat generation in the basal ration matrix.

A preferred feedstock has a DCAD atomic ratio of potassium:sodium in the range between about 1.54:1, and a DCAD weight ratio of potassium:magnesium in the range between about 3.4–4.6:1.

Another important aspect of the present invention is the incorporation of potassium-containing macromineral in feedstock which is provided by potassium bicarbonate and/or potassium carbonate sesquihydrate. As demonstrated in the Example, if an anhydrous inorganic salt such as potassium carbonate is incorporated in a basal ration when formulating a ruminant feedstock, the potassium carbonates absorbs moisture and thereby causes an incipient chemical heat generation in the bulk feedstock. A darkening of the feedstock is apparent, and there is a detectable odor and evidence of steam vapors.

When this altered type of feedstock is fed to dairy cattle, there may be a decline in dry matter intake because of a palatability problem. Consequentially, the overall results may be a challenged cow herd and a reduced milk yield.

Potassium bicarbonate and potassium carbonate sesquihydrate do not cause heat generation when incorporated in a feedstock. Potassium carbonate sesquihydrate is a preferred ruminant feedstock ingredient because it has a high potassium content, and it is economical and readily available.

As a cautionary measure, other feedstock ingredients such as sodium carbonate or sodium sulfate preferably are in a hydrated state in order to prevent molecular water absorption and chemical heat generation.

A present invention DCAD macromineral prescription is administered in a conventional feedstock of the type developed for lactating cows. Typical feedstocks are basal rations as described in publications such as J. Dairy Sci., 77, 1437 (1994); 77, 1661 (1994); and 77, 3096 (1994); incorporated by reference.

A feedstock for lactating cows will be varied over the lactation cycle. A typical feedstock will include silage, and energy concentrate and protein concentrate. A basal feedstock can comprise 6.4 kg corn silage (35% dry matter), 17 kg alfalfa silage (50% dry matter), 1 kg alfalfa hay, and 6.9 kg energy and 2.1 kg protein concentrate.

The compositions of an energy concentrate and a protein concentrate are illustrated in TABLE I.

TABLE I

| | Weight, % |
|---|---|
| ENERGY CONCENTRATE | |
| Ground shelled corn | 56.87 |
| Ground ear corn | 34.50 |
| Molasses | 2.00 |
| Animal/vegetable fat | 1.00 |
| Minerals and vitamins | 5.63 |
| PROTEIN CONCENTRATE | |
| Soybean meal - 44% | 60.88 |
| Soybran hulls | 26.20 |
| Molasses | 1.00 |
| Fish meal | 3.90 |
| Animal/vegetable fat | 1.00 |
| Sodium bicarbonate | 3.90 |
| Magnesium oxide | 0.92 |

One or more other ingredients can be incorporated in a present invention feedstock composition, such as biologically active derivatives.

An optional biologically active ingredient can be included in a feedstock in an effective quantity between about 0.05–20 weight percent, based on the weight of feedstock. It can be selected from a broad variety of nutrients and medicaments, either as a single component or as a mixture of components, which are illustrated by the following listing of active species:

1. sugars and complex carbohydrates which include both water-soluble and water-insoluble monosaccharides, disaccharides and polysaccharides.

Cane molasses is a byproduct from the extraction of sucrose from sugar cane. It is commercially available at standard 79.5° Brix concentration, which has a water content of about 21 weight percent, and a sugar content of 50 weight percent. Sugar beet byproducts also are available as low cost carbohydrate sources.

Whey is a byproduct of the dairy industry. The whey is a dilute solution of lactalbumin, lactose, fats, and the soluble inorganics from milk. Dried whey solids typically have the following composition:

| | |
|---|---|
| Protein | 12.0% |
| Fat | 0.7% |
| Lactose | 60.0% |
| Phosphorus | 0.79% |
| Calcium | 0.874% |
| Ash | 9.7% |

Another source of carbohydrate is derived from the pulp and paper industry which produces large quantities of byproduct lignin sulfonates from wood during the sulfite pulping process. The carbohydrate byproduct is a constituent of the spent sulfite liquor.

2. aminoacid ingredients either singly or in combination which include arginine, histidine, isoleucine, leucine, lysine, methionine, phenylalanine, threonine, tryptophan, valine, tyrosine ethyl HCl, alanine, aspartic acid, sodium glutamate, glycine, proline, serine, cysteine ethyl HCl, and the like, and analogs and salts thereof.

3. vitamin ingredients either singly or in combination which include thiamine HCl, riboflavin, pyridoxine HCl, niacin, niacinamide, inositol, choline chloride, calcium pantothenate, biotin, folic acid, ascorbic acid, vitamin $B_{12}$, p-aminobenzoic acid, vitamin A acetate, vitamin K, vitamin D, vitamin E, and the like.

Trace element ingredients include compounds of cobalt, copper, manganese, iron, zinc, tin, nickel, chromium, molybdenum, iodine, silicon, vanadium, selenium, calcium and magnesium.

4. protein ingredients as obtained from sources such as dried blood or meat meal, dried and sterilized animal and poultry manure, fish meal, liquid or powdered egg, fish solubles, cell cream, soybean meal, cottonseed meal, canola meal, and the like.

Protein ingredients include non-protein nitrogen compounds such as urea, biuret, ammonium phosphate, and the like.

5. antioxidants as illustrated by butylated hydroxyanisole, butylated hydroxytoluene, tocopherol, tertiary-butylhydroquinone, propyl gallate, and ethoxyquin; and suitable preservatives include sodium sorbate, potassium sorbate, sodium benzoate, propionic acid, a-hydroxybutyric acid, and the like.

6. suspension stabilizing agents which preferably are selected from nonionic surfactants, hydrocolloids and cellulose ethers. These types of chemical agents are illustrated by polyethylene oxide condensates of phenols, $C_8$–$C_{22}$ alcohols and amines; ethylene oxide reaction products with fatty acid partial esters of hexitans; alkylarylpolyoxyethylene glycol phosphate esters; gum arabic; carob bean gum; tragacanth gum; ammonium, sodium, potassium and calcium alginates; glycol alginates; xanthan gum; potato agar; alkylcellulose; hydroxyalkylcellulose; carboxyalkylcellulose; and the like.

The feedstock initially is metabolized in the mumen of cattle and other ruminants. The rumen contains microorganisms, such as bacteria and protozoa, which break down complex compounds ingested by the animal via a fermentation process.

The present invention further contemplates the provision of feedstock supplements which have varied weight ratios of rumen-available macromineral ingredients to facilitate formulation of feedstocks with a target DCAD and required K:Na and K:Mg proportions.

| Macromineral Supplements | |
|---|---|
| | Parts by Weight |
| Sodium-containing ingredient | 30–60 |
| Potassium-containing ingredient | 20–60 |
| Magnesium-containing ingredient | 5–25 |

A macromineral supplement can be in the form of powder, granules, pellets, or the like. A supplement can contain other ingredients such as a binder, or an active agent such as a nonprotein nitrogen composition.

In a further embodiment, a supplement can have controlled-release properties. This is illustrated by a supplement which is composed of coated particles of a core matrix of macrominerals which comprise the above described sodium, potassium and magnesium ingredient weight ratios. A nonprotein nitrogen ingredient such as urea can be included in a quantity up to about 80 weight percent of the core matrix of the coated particles. The coating can be of the type described in publications such as U.S. Pat. No. 3,413,118 and U.S. Pat. No. 5,803,946; incorporated by reference. A selected coating, such as polyvinyl acetate, has rumen-degradable properties.

The macrominerals in an invention feedstock have significant metabolic interrelationships relative to the health and lactational performance of dairy cattle. Animal trials have indicated that a magnesium deficiency results in failure to retain potassium, which can lead to a potassium deficiency. Also, excessive levels of potassium interfere with magnesium absorption. Because sodium and potassium must be in balance, excessive use of salt depletes an animal's potassium supply (pages 99–104. Feeds & Nutrition. Second edition, Ensminger Publishing Co., 1990).

Clinical studies have provided evidence that magnesium is essential for keeping the intracellular potassium constant. Dietary deprivation of magnesium is accompanied by muscle potassium deficit despite an abundant supply of potassium. In animal studies, a diet depleted of potassium caused a significant hypokalemia and hypermagnesemia, a diuresis and natriuresis, a magnesiuria, and a decrease in the fecal excretion of magnesium (Chapter 12. Magnesium:lts Biological Significance. CRC press, Inc., Boca Ration, Fla.).

"Nutrient Requirements of Dairy Cattle" (1989) by the National Research Council lists recommended nutrient content of diets for dairy cattle (Table 6–5, page 87). For early lactation, the recommended diet contents are 0.18% sodium, 1% potassium, and 0.25% magnesium (DM basis). Under conditions of heat stress, potassium can be increased to 1.2%; and under conditions conducive to grass tetany, magnesium can be increased to 0.3% to satisfy distress macromineral requirements.

The following Example is further illustrative of the present invention. The components and specific ingredients are presented as being typical, and various modifications can be derived in view of the foregoing disclosure within the scope of the invention.

EXAMPLE

This Example illustrates the improved lactational performance of dairy cows which are fed in accordance with the present invention.

A.

Seventy Holstein dairy cows are randomly assigned at calving to receive one of seven postpartum treatments beginning at 7 days postpartum through day 70 of lactation.

The basal diet is formulated to meet or exceed NRC requirements for protein, energy, UIP, DIP, NDF, vitamins and minerals. The diet contains (DM basis) a 50:50 forage-:concentrate ratio with 80% of the forage from corn silage and 20% from a mixed legume-grass haylage (DM basis). The concentrate portion of the diet is composed of high moisture ear corn and a commercial supplement containing corn, barley, soybean meal, distiller's grains, fishmeal and blood meal, The basal diet is formulated to contain a dietary cation-anion difference (DCAD) of +15.5 meq/100 g DM with DCAD calculated as meq (Na+K)–(Cl+S). Of the seven treatments, one is the basal diet, three have DCAD adjusted to +30.0 meq/100 g DM using either Na from sodium bicarbonate, K from potassium carbonate sesquihydrate or a 50:50 (weight basis) mixture of each, and the remaining three diets have their DCAD adjusted to +60.0 meq/100 g DM by the same method as the +30.0 DCAD diets. The actual DCAD analyses of the diets are +18.0, +25.2 and +52.0 meq/100 g DM for the formulated basal, +30.0 and +60.0 for the DCAD diets. The basal diet contains no additional sodium bicarbonate or potassium carbonate sesquihydrate.

All diets are offered as total mixed rations (TMR) delivered twice daily to assure a minimum of 10% of the total daily allotment as refusals the next day. Refusals are weighed and recorded daily prior to the morning feeding. The diets are offered within the first six days postpartum and measurements commenced on day 7 postpartum.

Rations are sampled weekly for DM analysis, and composited monthly for nutrient analysis. Milk is sampled weekly where AM/PM samples are proportionally composited for fat and protein analysis. Venous blood is sampled by tail venipuncture once per week for pH and bicarbonate analysis.

Measurements are daily feed intake and milk production (2 times/day milking) and weekly milk analysis, blood pH and blood bicarbonate.

The collected data measure dry matter intake (DMI) versus dietary cation-anion difference (DCAD) in the early lactation phase of the tested dairy cows. The data demonstrate that the highest DMI is obtained with the +52 diet having a K:Na ratio of 50:50 (weight basis).

The data demonstrate that the highest milk yield is obtained with the +52 DCAD diet having a K:Na ratio of 50:50 (weight basis).

The data demonstrate that the highest blood bicarbonate is obtained with the +52 DCAD diet having a K:Na ratio of 50:50 (weight basis).

Similar results are obtained when DCAD is in the range of 20–60 meq/100 g dietary DM, the K:Na atomic ratio in the range of 1.5:1, and the K:Mg weight ratio is in the range of 3–5:1.

A preferred DCAD is between about 30–55 meq/100 g dietary DM, a preferred K:Na atomic ratio is between about 1.5–4:1, and a preferred K:Mg weight ratio is between about 3.4–4.6:1.

Practice of the invention embodiments is most beneficial to dairy cattle during the 5–10 months of lactation. Typically the feedstock formulations are adjusted tol achieve a target DCAD in the range of about 25–60 meq/100 g dietary DM. Reformulations are facilitated by blending a particular type of dietary ration with a customized macromineral supplement weight ratio:

| Macromineral Supplements | | | | |
| --- | --- | --- | --- | --- |
| | Parts by Weight Blends | | | Range |
| Sodium bicarbonate and/or sodium sesquicarbonate | 50 | 45 | 40 | (30–60) |
| Potassium bicarbonate and/or Potassium carbonate sesquihydrate | 40 | 40 | 40 | (20–60) |
| Magnesium oxide | 10 | 15 | 20 | (5–25) |

Since potassium carbonate sesquihydrate tends to be hygroscopic under conditions of high humidity, it is advantageous to store potassium carbonate sesquihydrate as a premixture with between about 2–20 weight percent of potassium bicarbonate. The premix is in the form of a free-flowing particulate blend.

The practice of the present invention as illustrated above provides improved health and lactational performance of lactating cows.

| | |
| --- | --- |
| Soybean meal (48%) | 755 |
| Cottonseed meal (41%) | 345 |
| Megalac ® (Church & Dwight) | 190 |
| $NaHCO_3$ | 132 |
| Prolac ® (H. J. Baker) | 190 |
| $K_2CO_3$ (Anhydrous; Church & Dwight) | 72 |
| Vitamin-mineral premix | 95 |
| Monocalcium phosphate | 60 |
| Limestone | 104 |
| NaCl | 57 |

The DCAD of the feedstock is in the range of 26–52.

After the feedstock formulation is completed, over a period of several days some changes in the stored feedstock occur. A darkening of the bulk is noted, and there is a detectable odor and evidence of steam vapors. A temperature measurement indicates that the internal temperature of the feedstock bulk is about 170° F.

Subsequently, the feedstock is fed to a commercial dairy herd. There is an apparent palatability problem, which results in a decline in the dry matter intake by the individual cows. An ultimate consequence is a reduced milk yield.

An investigation determines that chemical heat generation from hydration of the anhydrous $K_2CO_3$ ingredient is the cause of the palatability problem. The water content of the basal ration is a factor.

When the anhydrous $K_2CO_3$ ingredients is replaced with $K_2CO_3 \cdot 1.5\ H_2O$ in the feedstock formulation, no chemical heat generation occurs, and the water content of the basal ration is not a factor. Heat generation causes a deleterious chemical transformation of constituents in the basal ration matrix, and palatability is affected.

What is claimed is:

1. A method for improving the lactational performance of a dairy cow which comprises feeding a lactating cow with a feedstock having a prescribed content of macromineral nutrients; wherein the relative proportions of macrominerals in the feedstock are defined as a dietary cation-anion difference (DCAD) which corresponds to the equation:

DCAD=meq $(Na^+ + K^+) - (Cl^- + SO_4^{-2})/100$ g dietary DM where meq is milliequivalents, Na is sodium cations, K is potassium cations, Cl is chloride anions, $SO_4$ is sulfate anions, and DM is dry matter; wherein DCAD has a value between about 25–60 meq/100 g dietary DM, and the atomic ratio of potassium:sodium in the feedstock is between about 1–5:1; and wherein the DCAD potassium-containing macromineral is selected from the group consisting of potassium bicarbonate, potassium carbonate sesquihydrate, and mixtures thereof.

2. A method in accordance with claim 1 wherein the DCAD sodium-containing macromineral is selected from the group consisting of sodium bicarbonate, hydrated sodium carbonate, sodium sesquicarbonate, sodium chloride, hydrated sodium sulfate, hydrated sodium phosphate, and mixtures thereof.

3. A method for improving the lactational performance of a dairy cow which comprises feeding a lactating cow with a feedstock having a prescribed content of macromineral nutrients; wherein the relative proportions of macrominerals in the feedstock are defined as a dietary cation-anion difference (DCAD) which corresponds to the equation:

DCAD=meq $(Na^+ + K^+) - (Cl^+ SO_4^{-2})/100$ g dietary DM where meq is milliequivalents, Na is sodium cations, K is potassium cations, Cl is chloride anions, $SO_4$ is sulfate anions, and DM is dry matter; wherein DCAD has a value between about 25–60 meq/100 g dietary DM, and the atomic ratio of potassium:sodium in the feedstock is between about 1–5:1; and wherein the feedstock has a weight ratio of potassium:magnesium between about 3–5:1; and wherein the DCAD sodium-containing macromineral is selected from the group consisting of sodium bicarbonate, hydrated sodium carbonate, sodium sesquicarbonate, and mixtures thereof, and the DCAD potassium-containing micromineral is selected from the group consisting of potassium bicarbonate, potassium carbonate sesquihydrate, and mixtures thereof.

4. A method in accordance with claim 3 wherein the magnesium-containing ingredient comprises magnesium oxide.

5. A method in accordance with claim 3 wherein feedstock is administered to the dairy cow during the early or mid-lactation phase.

6. A method in accordance with claim 3 wherein a beneficial effect is increased dry matter intake (DMI).

7. A method in accordance with claim 1 wherein a beneficial effect is increased milk yield (MY).

8. A method in accordance with claim 1 wherein a beneficial effect is increased blood bicarbonate.

9. A feedstock for improving the lactational performance of dairy cows which comprises a supplemented basal ration having a prescribed content of micromineral nutrients; wherein the relative proportions of macrominerals in the feedstock are defined as a dietary cation-anion difference (DCAD) which corresponds to the equation:

$$DCAD = meq\ (Na^+ + K^+) - (Cl^- + SO_4^{-2})/100\ g\ dietary\ DM$$

where meq is milliequivalents, Na is sodium cations, K is potassium cations, Cl is chloride anions, $SO_4$ is sulfate anions, and DM is dry matter; and wherein DCAD has a value between about 25–60 meq/100 g dietary DM, and the atomic ratio of potassium:sodium in the feedstock is between about 1–5:1; wherein the feedstock has a weight ratio of potassium:magnesium between about 3–5:1; wherein the DCAD sodium-containing macromineral is selected from the group consisting of sodium bicarbonate, hydrated sodium carbonate, sodium sesquicarbonate, and mixtures thereof, and the DCAD potassium-containing macromineral is selected from the group consisting of potassium bicarbonate, potassium carbonate sesquihydrate, and mixtures thereof; and wherein the microminerals are incorporated in the feedstock without incipient chemical heat generation in the basal ration matrix.

10. A feedstock in accordance with claim 9 wherein the atomic ratio of potassium:sodium in the feedstock is between about 1.5–4:1, and the weight ratio of potassium:magnesium in the feedstock is between about 3.4–4.6:1.

11. A feedstock in accordance with claim 9 wherein the magnesium-containing ingredient comprises magnesium oxide.

12. A dietary supplement for incorporation in ruminant feedstock to improve the lactational performance of dairy cows, wherein the supplement is adapted to provide sodium, potassium and magnesium cations in calculated proportions to a basal ration, whereby the resultant macromineral specifications meet the requirements of a feedstock in accordance with claim 9.

13. A dietary supplement in accordance with claim 12 which exhibits controlled-release properties under rumen-incubation conditions.

14. A dietary supplement in accordance with claim 12 which has a content of nonprotein nitrogen.

15. A dietary supplement in accordance with claim 12 which has a content of urea.

16. A dietary supplement for incorporation in ruminant feedstock, wherein the supplement is adapted to provide sodium, potassium and magnesium cations in calculated proportions to a basal ration, and wherein the supplement content comprises the following parts by weight of macrominerals:

| | |
|---|---|
| Sodium bicarbonate and/or Sodium sesquicarbonate | 30–60 |
| Potassium bicarbonate and/or Potassium carbonate sesquihydrate | 20–60 |
| Magnesium oxide | 5–25 |

17. A dietary supplement in accordance with claim 16 wherein the potassium-containing macromineral is a free-flowing particulate blend comprising potassium carbonate sesquihydrate and between about 2–20 weight percent of potassium bicarbonate.

18. A dietary supplement in accordance with claim 16 which exhibits controlled-release properties under rumen-incubation conditions.

* * * * *

UNITED STATES PATENT AND TRADEMARK OFFICE
CERTIFICATE OF CORRECTION

PATENT NO.     : 6,299,913 B1
DATED          : October 9, 2001
INVENTOR(S)    : Block et al.

It is certified that error appears in the above-identified patent and that said Letters Patent is hereby corrected as shown below:

<u>Title page,</u>
Item [75], Inventors, change "Zuccarella" to -- Zuccarello --.

Signed and Sealed this

Sixth Day of August, 2002

Attest:

Attesting Officer

JAMES E. ROGAN
*Director of the United States Patent and Trademark Office*